United States Patent [19]

Young et al.

[11] Patent Number: 4,463,264

[45] Date of Patent: Jul. 31, 1984

[54] LIGHTWEIGHT NEUTRON DETECTOR

[75] Inventors: Charles A. Young; Bruce D. Geelhood; Dennis M. Silva, all of San Diego, Calif.

[73] Assignee: The United States of America as represented by the Secretary of the Navy, Washington, D.C.

[21] Appl. No.: 386,154

[22] Filed: Jun. 7, 1982

[51] Int. Cl.[3] .......................... H01J 47/12; G01T 3/06

[52] U.S. Cl. .................................... 250/390; 250/391; 250/392

[58] Field of Search ........................ 250/390, 392, 391

[56] References Cited

U.S. PATENT DOCUMENTS

| | | | |
|---|---|---|---|
| 2,756,345 | 7/1956 | Replogle, Jr. et al. | 250/379 |
| 2,790,919 | 4/1957 | Lykins et al. | 376/153 |
| 2,938,121 | 5/1960 | Fitzgerald et al. | 250/472.1 |
| 3,102,198 | 8/1963 | Bonner | 250/390 |
| 3,197,637 | 7/1965 | Kronenberg | 376/154 |
| 3,381,131 | 4/1968 | Meal et al. | 250/392 |
| 3,760,183 | 9/1973 | Neissel | 250/252.1 |
| 4,074,136 | 2/1978 | Heinzelmann et al. | 250/392 |

OTHER PUBLICATIONS

B. W. Thompson, "Fast-Neutron Scintillation Survey Meter," *Nucleonics,* vol. 12, No. 5, (May 1954) pp. 43–45.

*Primary Examiner*—Janice A. Howell
*Assistant Examiner*—Constantine Hannaher
*Attorney, Agent, or Firm*—Robert F. Beers; Ervin F. Johnston; Harvey Fendelman

[57] ABSTRACT

A neutron detector is disclosed which uses the moderating material as the structural support for the neutron detector element. A thin metal liner is affixed to the inside of the plastic moderating material encasement for containing a neutron detecting gas. A high voltage supply is connected to an electrical conductor which extends between the ends of the encasement and serves to furnish output pulses to a pulse counter upon the occurrence of ionization of the counting gas in response to neutron flux through the volume of the detector.

20 Claims, 1 Drawing Figure

NOTE: DRAWING NOT TO SCALE.

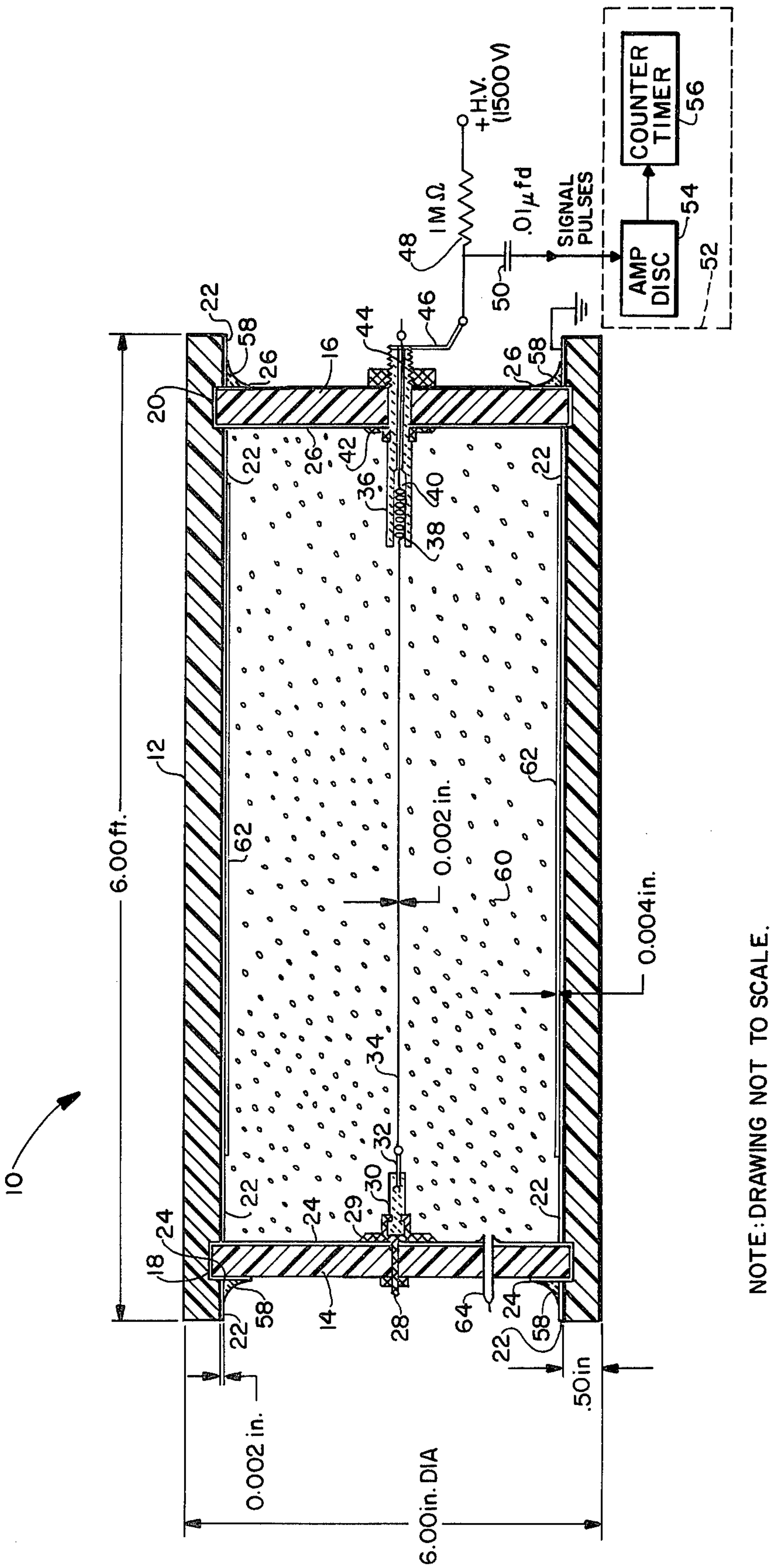
10
12
6.00 ft.
6.00 in. DIA
0.002 in.
.50 in
0.002 in.
0.004 in.
+H.V. (1500 V)
1 MΩ
.01 μfd
SIGNAL PULSES
AMP DISC
COUNTER TIMER
NOTE: DRAWING NOT TO SCALE.

LIGHTWEIGHT NEUTRON DETECTOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention disclosed and claimed herein pertains generally to the field of neutron detection devices and, more particularly, to neutron detection devices of the type which employ a metal housing known as a "log" which contains an ionizable counting gas.

In many applications, neutron detectors are weight limited such that reducing the total package weight is important either for the weight reduction for a given sensitivity or for an increase in sensitivity for a given allowed weight. Current neutron detector systems use $^{3}He$ or $^{10}BF_3$ gas as the neutron sensing material. This gas is often contained in a metal housing or "log" which weighs about 15 pounds and is approximately 40 mils thick. Such gas filled "logs" are then surrounded with a polyethylene moderator material which is typically a cylindrically shaped sleeve having a wall thickness of approximately 1 to 3 centimeters. This plastic sleeve is slipped over the metal log and serves as a moderator to reduce the energy of the neutron flux to thermal energies where the detecting material has a high neutron capture cross section. The metal case of such prior devices is typically made of stainless steel in order to be mechanically strong enough to withstand pressure changes, handling abuses and the like. In addition, the metal case serves as the ground plane for the counting wire, as an electrostatic shield and as an impermeable barrier between the active materials inside the detector and the external atmosphere. If the active isotope is $^{3}He$ which also is the counting gas, the helium must be contained within an electrical conductor since helium will diffuse through insulators.

The hydrogen atoms in the polyethylene material are the important neutron moderator. A solid hydrocarbon form is an efficient method of achieving a high number density of hydrogen atoms near the detector element. In the past the active sensor, "log", and the moderator have been structurally independent. The log with the metal case was self supporting and was slid into the moderator material which was also self supporting.

SUMMARY OF THE INVENTION

In accordance with the present invention, a neutron detection apparatus and method is disclosed for greatly reducing the total package weight of a neutron detector. Basically, this is accomplished by utilizing the necessary moderator material to provide the mechanical strength needed for the detector case, eliminating most of the metal previously used. Although a thin metal lining inside the moderator/case is still required to provide the electrostatic isolation, ground plane, and gas barrier functions, the metal lining can be only a few mils thick since the structural support for the detector is provided by the surrounding moderator/case.

This is accomplished by forming a case comprised of a moderator material, preferably a high hydrogen plastic, into an encasement for containing an ionizable counting gas and the sense wire of a pulse detector. A metal lining is then formed on the entire inner surface of the plastic case in order to provide for electrostatic isolation, ground plane and containment of the counting gas within the detector. In this manner the metal lining may be formed to a thickness that is substantially less than the wall thickness required by the prior art "logs", resulting in a substantial weight reduction over prior art designs due to the fact that the plastic material used as the encasement and structural support for the detector weighs substantially less than the metal "logs" previously utilized. Thus, a significant weight reduction in accordance with the present invention allows increased sensitivity for affixed allowed package weight. Once the plastic container is lined with the metal liner, an electrical conductor is stretched between the ends of the encasement to serve as the detector element of a pulse counter. The encasement may then be filled with an ionizable counting gas and then a high voltage applied to the electrical conductor.

When a flux of neutrons impinges upon the detector, the moderator material thermalizes the neutrons to increase the probability of detection. The nuclear reaction between the thermal-neutron and the active isotope in the counting gas produces an emission of a charged particle which results in ionization of the counting gas. Ionization of the counting gas is detected by the occurrence of a pulse on the electrical conductor. The amplitude of the pulse may be increased by means of "gas gain" or avalanche multiplication of the number of electrons in a cascade of collisions with atoms in the counting gas as the electrons are accelerated toward the high voltage center wire. Such pulses are amplified and counted by a signal pulse detector connected to the electrical conductor and positioned on the exterior of the encasement.

OBJECTS OF THE INVENTION

Accordingly, it is the primary object of the present invention to provide a lighter, more compact neutron detector than prior art designs.

It is a concomitant object of the present invention to disclose a neutron detector in which the neutron moderator is utilized as the detector encasement to result in a reduction in weight of the total sensor package.

Other objects and many of the attendant advantages of this invention will be readily appreciated as the same becomes better understood by reference to the following detailed description when considered in connection with the accompanying drawing.

BRIEF DESCRIPTION OF THE DRAWING

The sole FIGURE is a longitudinal cross section of a cylindrical embodiment of the neutron detector of the present invention.

DESCRIPTION OF THE PREFERRED EMBODIMENT

Referring now to the drawing, there are shown various components which may be assembled to form a neutron detector 10 in accordance with the present invention. It is to be understood at this point that, although the present invention is illustrated and described as having a generally cylindrical shape, other designs including rectangular cross section tubular, closed ended structures and other three-dimensional geometries may be utilized within the scope of the present invention. Referring to the drawing, it is seen that detector 10 of the present invention includes a cylindrically shaped moderator encasement 12 which may be made of polypropylene, polyethylene, polymethylpentene (all with a hydrogen:carbon ratio of 2:1) or any other suitable material that has a high hydrogen:carbon ratio. First and second end caps 14 and 16 are fitted within recesses 18 and 20 within the moderator encasement 12. The end caps 14 and 16 are preferably formed of the same material as moderator 12 and, likewise, serve a moderator function.

The detector 10 further includes a metal liner 22 formed on the inner surface of the encasement 12 and also metal liners 24 and 26 formed, respectively, on the surfaces of the end caps 14 and 16 as illustrated. The metal liners 22, 24 and 26 are preferably formed of copper which is chemically deposited or electroplated onto the surfaces of encasement 12 and end caps 14 and 16 as illustrated. It is to be understood, however, that metals other than copper may be utilized so long as the metal is transmissive to neutrons and can contain the counting gas to be described. Also, any other suitable technique for affixing the metal liners, 22, 24 and 26 onto the surfaces of encasement 12 and the end caps 14 and 16 may be utilized. One alternate is that of a thin metal foil structure which will suffice if the gas pressure inside always exceeds the external atmospheric pressure.

A standoff insulator 28 is fitted into end cap 14 as illustrated and may be secured to metal lining 24 by solder sealing metal ring 29 of insulator 28 to lining 24. Metal ring 29 is also bonded to ceramic insulator 28. The interior end of standoff insulator 28 includes a ceramic portion 30 and terminal 32 to which is affixed in a well known manner sense wire 34. A feed through insulator 36 is fitted into the other end cap 16 and is soldered at its inner end to metal liner 26. A conductive, tensioning spring 38 is positioned within chamber 40 formed within the insulated high voltage feed through 36. The tensioning spring 38 is connected to the end of sense wire 34, maintaining sense wire 34 taut during varying ambient temperatures. High voltage feed through insulator 36 includes a ring 42, similar to ring 29, both comprised, for example, of "Kovar" which, as is well known, is an iron-nickel-cobalt alloy comprised of 29% nickel, 17% cobalt, 53% iron and 1% minor ingredients. Ring 42 is bonded to the ceramic portion of the feed through insulator 36 and is soldered to the metal liner 26.

Conducting spring 38 is connected as stated above at one end to the sense wire 34. Its other end is connected to feed through wire 44 which passes through the interior channel of the ceramic insulator 36. The exterior end of conductor 44 is connected to high voltage connecting lug 46. A high voltage supply (not shown), such as a 1500 volt supply is connected via resistor 48 to the high voltage connecting lug 46 and also to capacitor 50. The other end of capacitor 50 is connected to pulse detector 52 which includes amplifier/discriminator 54 which in turn is connected to counter/timer 56.

The end caps 14 and 16 are solder sealed by solder seal fillets 58 to the metallic liners 24 and 26 which, as illustrated in the drawing, are formed on end caps 14 and 16 such that the metal liners 24 and 26 cover not only the interior portions of end caps 14 and 16, respectively, but also the periphery of the end caps 14 and 16 within the grooves 18 and 20. Lines 21 and 26 also cover a portion of the exterior surface of the end caps 14 and 16 as is illustrated. The detector 10 is filled with a counting gas 60 preferably comprised of a mixture of a helium-3 plus 5% argon at one atmosphere of pressure.

Optionally, a thin layer 62 of lithium-6 may be evaporated onto the inside of the detector 10 on the inner surface of the metal layer 22 as illustrated. This layer would approximately double the sensitivity of the $^3$He gas alone. When lithium-6 is used, counting gases other than the helium-3, argon mixture described above may be used. Finally, a gas fill pinch off tube 64 is positioned within end cap 14 for filling and evacuating the detector 10 with the ionizable counting gas 60.

The following is an enumeration of the dimensions of the present invention, by way of example only, it being understood that other dimensions could be utilized depending upon the particular application of detector 10.

Moderator/case 12 could have a six inch outside diameter, be six feet long and have a one-half inch wall thickness. Metal liner 22 may be 0.002 inches thick. Sense wire 34 may be 0.002 inches in diameter and may be formed of stainless steel. The lithium-6 optional layer 62 may be evaporated to a thickness of 0.004 inches. Capacitor 50 may be a 0.01 microfarad capacitor and resistor 48 may be a one megaohm resistor.

In order to manufacture detector 10, plastic encasement 12 is first formed, preferably in a tubular design. The encasement 12 is then journaled to form recesses 18 and 20 for receiving the end caps 14 and 16. Metal liner 22 is then formed on the inner surface of the encasement 12. Likewise, end caps 14 and 16 are formed and metal liners 24 and 26 are deposited or otherwise applied to the surfaces of the end caps 14 and 16 as is illustrated in the FIGURE. The ceramic insulators 28 and 36 are fitted onto the end caps 14 and 16, respectively, and the sense wire 34 is connected between them as illustrated. The optional layer 62 of lithium-6 may also be applied at this time. The end caps 14 and 16 are then fitted into place within the channels 18 and 20 as illustrated and counting gas 60 is introduced into the detector 10 via pinch off tube 64. The external electronic components including resistor 48, capacitor 50 and the pulse detector 52 may then be connected via high voltage connecting lug 46 to the feed through wire 44 and, via conducting spring 38 to the sense wire 34.

The detector 10 of the present invention operates as follows. When the detector 10 is placed in an area of neutron flux, a neutron will pass through the moderator 12 which slows the neutron down to detection speeds. The neutron then will also pass through the neutron transmissive metal liner 22 and enter the interior of the detector 10. When the neutron interacts with the detector, either with $^3$He ($^3He+n \rightarrow p+^3H+770$ keV) or with $^6$Li($^6Li+n \rightarrow ^3H+^{11}He+4.78$ MeV), charged reaction particles produce ionization of the counting gas 60. Ionization of the counting gas causes an electrical pulse to appear on sense wire 34, the pulse being enhanced in amplitude by means of avalanche multiplication. These pulses are thus sensed and subsequently counted by pulse detector 52.

Obviously, many other modifications and variations of the present invention are possible in the light of the above teachings. It is therefore to be understood that within the scope of the appended claims the invention may be practiced otherwise than as specifically described.

What is claimed is:

1. In a neutron detector including a metallic encasement containing a neutron detecting gas and further including a moderator material disposed on the outer surface of said metallic encasement, the improvement comprising:

said moderator material being the structural support member for said metallic encasement.

2. The improvement of claim 1 wherein:

said moderator material comprises plastic.

3. The improvement of claim 2 wherein:

said moderator material comprises polypropylene.

4. The improvement of claim 1 wherein:

said moderator material is in the form of a tubular structure having first and second ends and further having first and second end caps closing off said first and second ends.

5. The improvement of claim 4 wherein:

said tubular structure is a cylindrical tubular structure.

6. The improvement of claim 5 further comprising:

an electrical conductor extending between said first and second end caps.

7. The improvement of claim 4 wherein:

said moderator tubular structure has an inner surface and said layer of metal entirely coats said inner surface.

8. The improvement of claim 7 further comprising:

a first electrical feed through insulator secured to said first end cap; and a second electrical feed through insulator secured to said second end cap.

9. The improvement of claim 8 further comprising an electrical conductor extending between said first and second end caps and wherein said electrical conductor is secured to said first and second feed through insulators.

10. The improvement of claims 1 or 2 wherein:

said moderator material is approximately one-half inch thick.

11. The improvement of claim 10 wherein said metallic encasement is approximately 0.002 inches thick.

12. The improvement of claim 6 further comprising:

a pulse detector operably connected to said electrical conductor.

13. The improvement of claim 12 wherein said pulse detector comprises:

an amplifier-discriminator operably coupled to said electrical conductor; and a counter-timer operably coupled to said amplifier discriminator.

14. The improvement of claims 1 or 2 wherein said neutron detecting gas comprises helium-3.

15. The improvement of claims 1 or 2 further comprising:

a layer of lithium-6 disposed on the inner surface of said metallic encasement.

16. The improvement of claim 15 wherein said layer of lithium-6 is approximately 0.004 inches thick.

17. A neutron detector comprising:

an encasement comprised of moderator material having an interior and an exterior surface;

means comprising a metal disposed on said encasement inner surface for containing a neutron detecting gas, said metal means being supported by said moderator material encasement;

a neutron detecting gas enclosed within said metal means; and means in contact with said gas for detecting ionization of said gas.

18. The detector of claim 17 wherein:

said metal means comprises a metal layer approximately 0.002 inches thick.

19. The detector of claim 18 wherein:

said encasement is approximately 0.5 inches thick.

20. A method of manufacturing a neutron detector comprising the steps of:

forming a plastic case having a hollow interior portion, an interior surface and first and second ends;

depositing a metal lining on the entire interior surface of said plastic case;

connecting an electrical conductor so that it extends between said first and second ends;

filling said case with an ionizable counting gas and hermetically sealing said case; and connecting a pulse detector to said electrical conductor.

* * * * *